United States Patent
Teichmiller et al.

(10) Patent No.: US 9,587,446 B2
(45) Date of Patent: Mar. 7, 2017

(54) SUBSEA REMOVABLE FLEX JOINT LAYDOWN TOOL

(71) Applicants: Noah Teichmiller, Houston, TX (US); Jack Darryl Payne, Spring, TX (US); Hugh M. Thompson, Houston, TX (US); Jonathan Bowman, Houston, TX (US); Edward Nakajima, Sugar Land, TX (US)

(72) Inventors: Noah Teichmiller, Houston, TX (US); Jack Darryl Payne, Spring, TX (US); Hugh M. Thompson, Houston, TX (US); Jonathan Bowman, Houston, TX (US); Edward Nakajima, Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/670,258

(22) Filed: Mar. 26, 2015

(65) Prior Publication Data

US 2016/0281444 A1    Sep. 29, 2016

(51) Int. Cl.
*F16L 1/12* (2006.01)
*E21B 19/00* (2006.01)
*E21B 17/01* (2006.01)

(52) U.S. Cl.
CPC .......... *E21B 19/002* (2013.01); *E21B 17/017* (2013.01); *F16L 1/12* (2013.01)

(58) Field of Classification Search
CPC combination set(s) only.
See application file for complete search history.

(56) References Cited

U.S. PATENT DOCUMENTS 4,725,088 A * 2/1988 Mank ............... B66C 13/02
                                                24/114.5
6,557,637 B1   5/2003 Dore et al.
(Continued)

FOREIGN PATENT DOCUMENTS

EP    1676975       7/2006
EP    1282757       3/2008
WO    WO 01/86110   11/2001

OTHER PUBLICATIONS

Mitchell, S, Reel, M. Littleton, R. Cody, R. Stallings, H. "Extending the Operational Window During Gulf of Mexico Loop Currents." Western Well Tool. Pioneer Natural Resces Inc. World Oil. vol. 227, No. 7, pp. 71-73, Jul. 2006.

(Continued)

*Primary Examiner* — Kyle Armstrong
(74) *Attorney, Agent, or Firm* — King & Spalding LLP

(57) ABSTRACT

A subsea removable flex joint laydown tool is described herein. The tool can include a body having a first portion and a second portion hingedly coupled to the first portion. The tool can also include a flex joint coupling feature disposed on an inner surface of the first portion and the second portion toward a proximal end of the body, where the flex joint coupling feature is configured to couple with a first laydown tool coupling feature of a flex joint. The tool can further include a riser coupling feature disposed on the inner surface of the first portion and the second portion toward a distal end of the body, where the riser coupling feature is configured to couple with a second laydown tool coupling feature of a riser. The tool can also include at least one laydown tool coupling feature movably coupled to the first portion.

20 Claims, 11 Drawing Sheets

(56) References Cited

U.S. PATENT DOCUMENTS

| | | | |
|---|---|---|---|
| 7,040,406 B2 | 5/2006 | Dore | |
| 7,591,315 B2 | 9/2009 | Dore | |
| 2004/0074647 A1* | 4/2004 | Adams | E21B 19/002 |
| | | | 166/338 |
| 2004/0173356 A1 | 9/2004 | Dore | |
| 2006/0157252 A1 | 7/2006 | Dore | |
| 2010/0294504 A1* | 11/2010 | Wajnikonis | E21B 17/015 |
| | | | 166/345 |
| 2012/0018164 A1* | 1/2012 | Tabor | E21B 19/002 |
| | | | 166/340 |
| 2012/0125636 A1* | 5/2012 | Linde | E21B 19/002 |
| | | | 166/382 |
| 2013/0014954 A1* | 1/2013 | Killeen | E21B 43/0122 |
| | | | 166/341 |

OTHER PUBLICATIONS

Eaton, L.F. "Tool Joint Heat Checking while Predrilling for Auger TLP Project." Shell Offshore Inc. SPE/IADC Drilling Conf (Amsterdam, Neth. Feb. 23-25, 1993) PROC pp. 941-951. 1993 (SPEC/IADC-25776, 4 Refs).

* cited by examiner

SUBSEA REMOVABLE FLEX JOINT LAYDOWN TOOL

TECHNICAL FIELD

The present disclosure relates generally to the subsea field operations, and more specifically to a flex joint laydown tool that can be removed as part of a subsea field operation.

BACKGROUND

When exploration of a subterranean wellbore has been completed, the equipment used for the exploration process is removed and replaced by equipment used for production of the subterranean resources made accessible within the wellbore by the exploration process. The exploration and production processes are referred to more generally as field operations. Because of the size and scale of the exploration and production process components, many of these components are staged ahead of time to ease the transition process. When the wellbore is under water (subsea), special equipment is required to manipulate various production process components that are located under water, often at or near the seabed.

As an example, before a riser and flex joint (part of the production equipment) are laid on the seabed for subsequent installation under water, a flex joint laydown tool (also called, more simply, a laydown tool) is installed above the water level. In such a case, the laydown tool is coupled to the riser and the flex joint where the riser and flex joint adjoin each other. The laydown tool helps prevent damage to the riser and flex joint during laydown on the seabed and subsequent recovery by transmitting the load of the riser (also called a steel catenary riser or SCR) to the flex joint body and by preventing over-stressing of the bellows and ball joint within the flex joint. As such, the laydown tool protects the flex joint from bending and from axial tension/compression beyond design limits during the laydown and recovery process.

SUMMARY

In general, in one aspect, the disclosure relates to a subsea removable flex joint laydown tool. The flex joint laydown tool can include a body having a first portion and a second portion hingedly coupled to the first portion. The flex joint laydown tool can also include a flex joint coupling feature disposed on an inner surface of the first portion and the second portion toward a proximal end of the body, where the flex joint coupling feature is configured to couple with a first laydown tool coupling feature of a flex joint. The flex joint laydown tool can further include a riser coupling feature disposed on the inner surface of the first portion and the second portion toward a distal end of the body, where the riser coupling feature is configured to couple with a second laydown tool coupling feature of a riser. The flex joint laydown tool can also include at least one laydown tool coupling feature movably coupled to the first portion, where the at least one laydown tool coupling feature couples to the second portion when the body is in a closed position, where the at least one laydown tool coupling feature decouples from the second portion when the body is in an open position.

In another aspect, the disclosure can generally relate to a riser and flex joint assembly. The riser and flex joint assembly can include a flex joint having a first laydown tool coupling feature disposed on a bottom surface of a flex joint body of the flex joint. The riser and flex joint assembly can also include a riser having a second laydown tool coupling feature disposed on an outer surface of a riser body of the riser. The riser and flex joint assembly can further include a subsea removable laydown tool coupled to the riser and the flex joint. The laydown tool of the riser and flex joint assembly can include a body having a first portion and a second portion hingedly coupled to the first portion. The laydown tool of the riser and flex joint assembly can also include a flex joint coupling feature disposed on an inner surface of the first portion and the second portion toward a proximal end of the laydown tool body, where the flex joint coupling feature couples with the first laydown tool coupling feature of the flex joint. The laydown tool of the riser and flex joint assembly can further include a riser coupling feature disposed on the inner surface of the first portion and the second portion toward a distal end of the laydown tool body, where the riser coupling feature couples with the second laydown tool coupling feature of the riser. The laydown tool of the riser and flex joint assembly can also include at least one laydown tool coupling feature movably coupled to the first portion, where the at least one laydown tool coupling feature couples to the second portion when the laydown tool body is in a closed position, where the at least one laydown tool coupling feature decouples from the second portion when the laydown tool body is in an open position. The laydown tool is coupled to the flex joint and the riser while under water during a subsea field operation.

In yet another aspect, the disclosure can generally relate to a method for removing a subsea removable laydown tool from a riser flex joint subassembly in a subsea field. The method can include coupling, while under water in the subsea field, at least one removal device to a removal device coupling feature disposed on the laydown tool. The method can also include releasing, while under water in the subsea field, at least one laydown tool coupling feature of the laydown tool to put the laydown tool in an open position from a closed position, where the laydown tool is coupled to the flex joint subassembly when the laydown tool is in the closed position, where the flex joint subassembly comprises a flex joint and a riser. The method can further include removing, while under water in the subsea field, the laydown tool from the riser flex joint subassembly.

These and other aspects, objects, features, and embodiments will be apparent from the following description and the appended claims.

BRIEF DESCRIPTION OF THE DRAWINGS

The drawings illustrate only example embodiments of methods, systems, and devices for a flex joint laydown tool and are therefore not to be considered limiting of its scope, as flex joint laydown tools may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
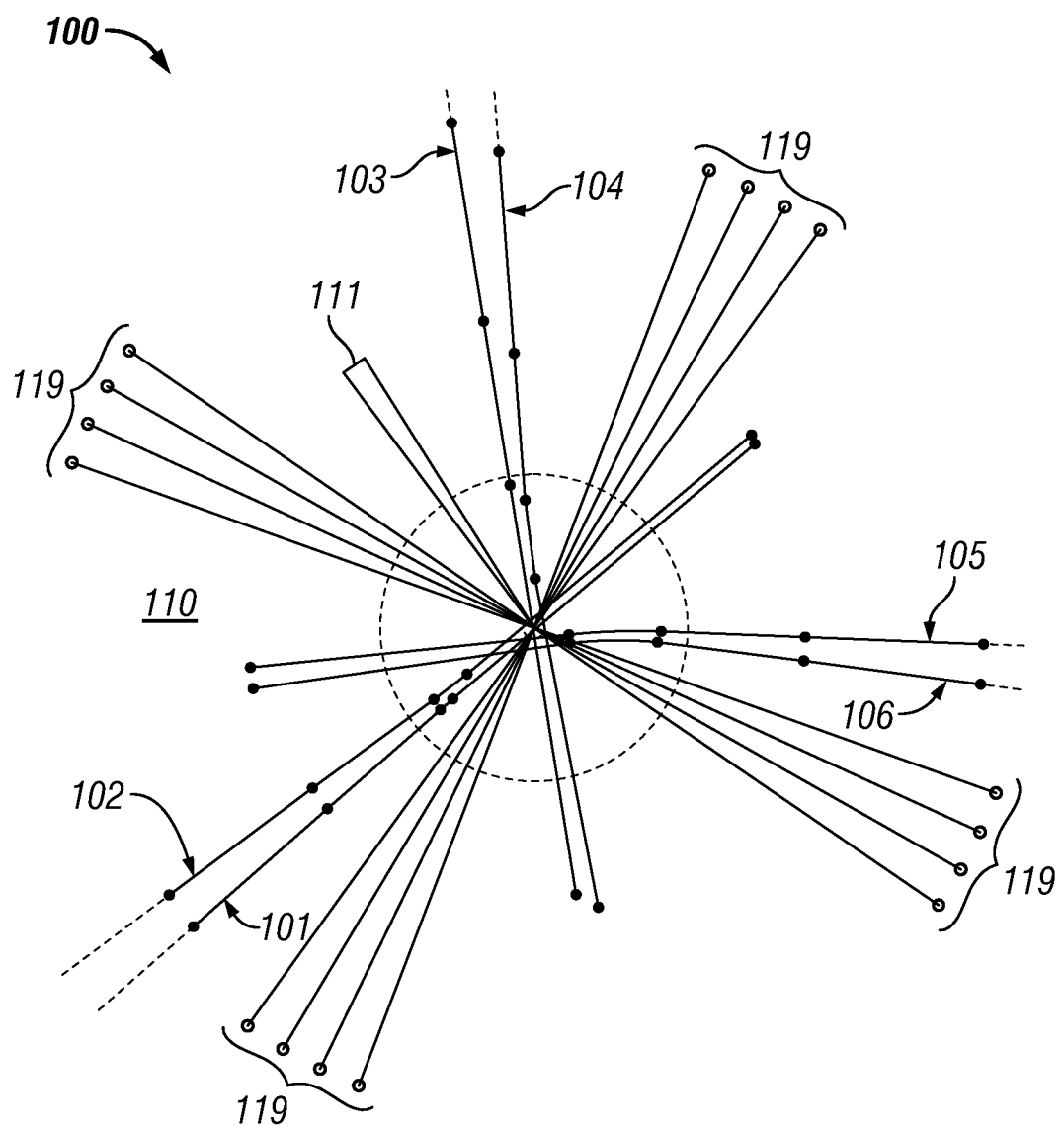
FIG. 1 shows a schematic diagram of an underwater field system with tools laid temporarily on the seabed in accordance with current practices in the art.

The example embodiments discussed herein are directed to systems, apparatuses, and methods of subsea removable flex joint laydown tools (also simply called a "laydown tool"). While the example flex joint laydown tools described herein are directed toward a riser and flex joint assembly in a subsea operation, uses of example flex joint laydown tools are not limited to riser flex joint assemblies. A user as described herein may be any person that is involved with a subsea production field operation. Examples of a user may include, but are not limited to, a crane operator, a roughneck, a company representative, a drilling engineer, a tool pusher, a service hand, a field engineer, an electrician, a mechanic, an operator, a consultant, a contractor, and a manufacturer's representative.

Any example flex joint laydown tools, or portions (e.g., components) thereof, described herein can be made from a single piece (as from a mold). When an example flex joint laydown tool or portion thereof is made from a single piece, the single piece can be cut out, bent, stamped, and/or otherwise shaped to create certain features, elements, or other portions of a component. Alternatively, an example flex joint laydown tool (or portions thereof) can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example flex joint laydown tool) can be made of one or more of a number of suitable materials, including but not limited to metal, ceramic, rubber, and plastic.

A coupling feature (including a complementary coupling feature) as described herein can allow one or more components and/or portions of an example flex joint laydown tool to become mechanically coupled, directly or indirectly, to another portion of the flex joint laydown tool. A coupling feature can include, but is not limited to, portion of a hinge, an aperture, a recessed area, a protrusion, a slot, a spring clip, a tab, a detent, and mating threads. One portion of an example flex joint laydown tool can be coupled to another portion of a flex joint laydown tool by the direct use of one or more coupling features.

In addition, or in the alternative, a portion of an example flex joint laydown tool can be coupled to another portion of the flex joint laydown tool using one or more independent devices that interact with one or more coupling features disposed on a component of the flex joint laydown tool. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

Example embodiments of flex joint laydown tools will be described more fully hereinafter with reference to the accompanying drawings, in which example embodiments of flex joint laydown tools are shown. Flex joint laydown tools may, however, be embodied in many different forms and should not be construed as limited to the example embodiments set forth herein. Rather, these example embodiments are provided so that this disclosure will be thorough and complete, and will fully convey the scope of flex joint laydown tools to those of ordinary skill in the art. Like, but not necessarily the same, elements (also sometimes called components) in the various figures are denoted by like reference numerals for consistency.

Terms such as "first," "second," "top," "bottom," "inner," "outer," and "side" are used merely to distinguish one component (or part of a component or state of a component) from another. Such terms are not meant to denote a preference or a particular orientation, and are not meant to limit embodiments of flex joint laydown tools. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIGS. 1-4 show various aspects of utilization of a riser and flex joint assembly during a field operation in accordance with current practices in the art. Specifically, FIGS. 1-4 show how, in the current art, the riser flex tool assembly is lifted from the seabed 110 (often at a depth of thousands of feet below the water level 121) into a work platform of a construction vessel so that the flex joint laydown tool can be removed. By contrast, as shown in FIGS. 5A-6B below, example embodiments reduce the time required to remove the flex joint laydown tool, and eliminates the inherent safety risk of performing this act.

Referring to FIGS. 1-4, FIG. 1 shows a schematic diagram of an underwater field system 100 with tools laid temporarily (e.g., weeks, months, years) on the seabed 110 in accordance with current practices in the art. Specifically, the underwater field system 100 in this example includes a number of assemblies (e.g., assembly 101, assembly 102, assembly 103, assembly 104, assembly 105, assembly 106) that are laid down in the proximate area of the floating production unit 111. These assemblies are used to create a production assembly used to extract the subterranean resources and bring them to the water level 121 (also called the surface 121) or to export them from an offshore production unit to a facility onshore. A tremendous amount of planning must be used to assemble the production assembly using the assemblies shown in FIG. 1. For example, a user must determine where and in what order to lay down the assemblies on the seabed 110, where to tie on to those assemblies to lift them, the placement of the mooring lines 119, and the order and bearing that the assemblies are lifted.

Figure 2A:
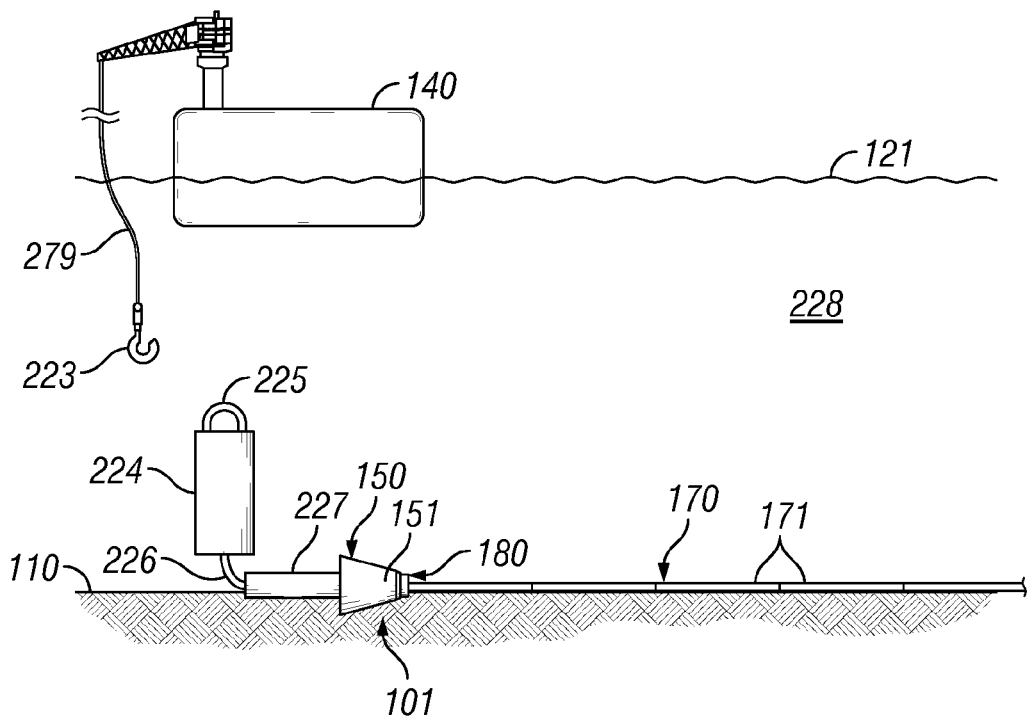
FIGS. 2A and 2B show a riser and flex joint assembly being lifted from the seabed to the surface in accordance with current practices in the art.
Figure 2B:
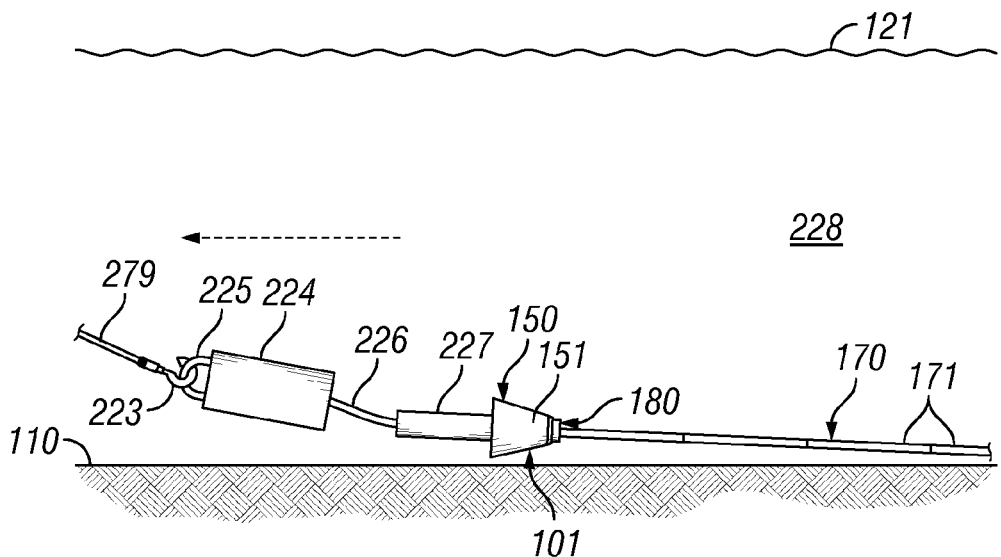

For example, as shown in FIGS. 2A and 2B, a construction vessel 140 floating at the water level 121 can lift a lifting line 279 with a hook 223 using a lifting device (e.g., a crane) on the construction vessel 140 above the surface 121. An assembly (in this case, a riser and flex joint assembly 101) can be laying subsea 228 on the seabed 110. A buoyancy module 224 with rigging 225 is attached to a top end of the riser and flex joint assembly 101 by a cable 226.

Once the hook 223 engages with the rigging 225 on the buoyancy module 224, the construction vessel 140 with the lifting device is moved to a different location at the surface 121 relative to the riser and flex joint assembly 101 according to a pre-planned bearing and initially pulls on the buoyancy module 224 at an acute angle to put the riser and flex joint assembly 101 under tension, and then begins to lift the buoyancy module 224 while the riser and flex joint assembly 101 remains under tension, which in turn begins to lift the riser and flex joint assembly 101 without damaging (for example, from buckling) any of the components (e.g., the riser 170) of the riser and flex joint assembly 101. As the top end of the riser and flex joint assembly 101 continues to be lifted, the construction vessel 140 with the lifting device continues to move along its bearing.

The riser and flex joint assembly 101 includes a flex joint 150, a riser 170, and a laydown tool 180. There is also a flooding head 227 attached to the flex joint 150. The riser 170 is a series of metal pipe 171, connected end-to-end, that is used to allow one or more components (e.g., subterranean resources) to be transported between the floating production unit (not shown, but floating at the surface 121) and the wellbore in the subterranean formation. The diameter of the riser 170 can be 10 inches or greater. In some cases, the diameter of the riser 170 is less than 10 inches. The laydown tool 180 preloads the flex joint 150 in axial tension to protect the riser 170 from shock, bending, and axial loading.

Figure 3A:
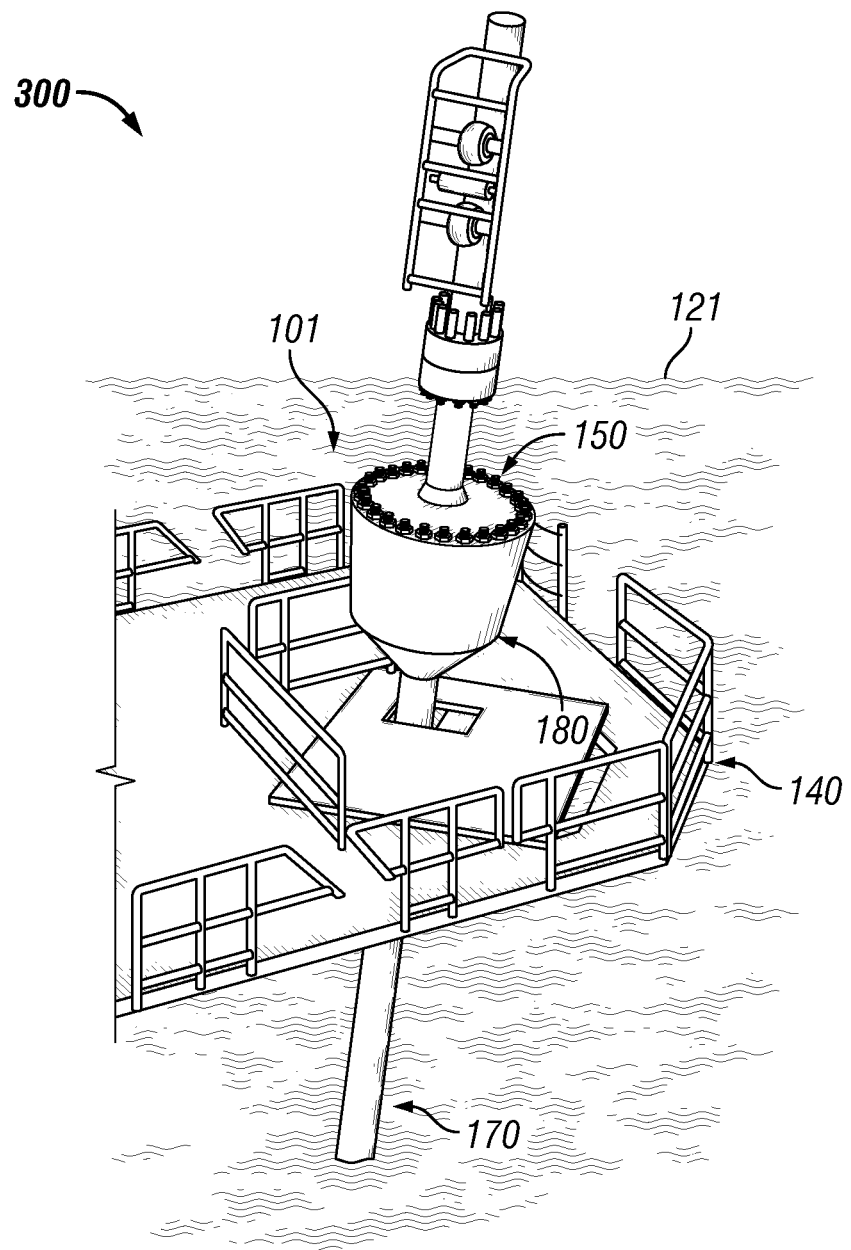
FIGS. 3A and 3B show a riser and flex joint assembly mounted on a work platform of a construction vessel in accordance with current practices in the art.
Figure 3B:
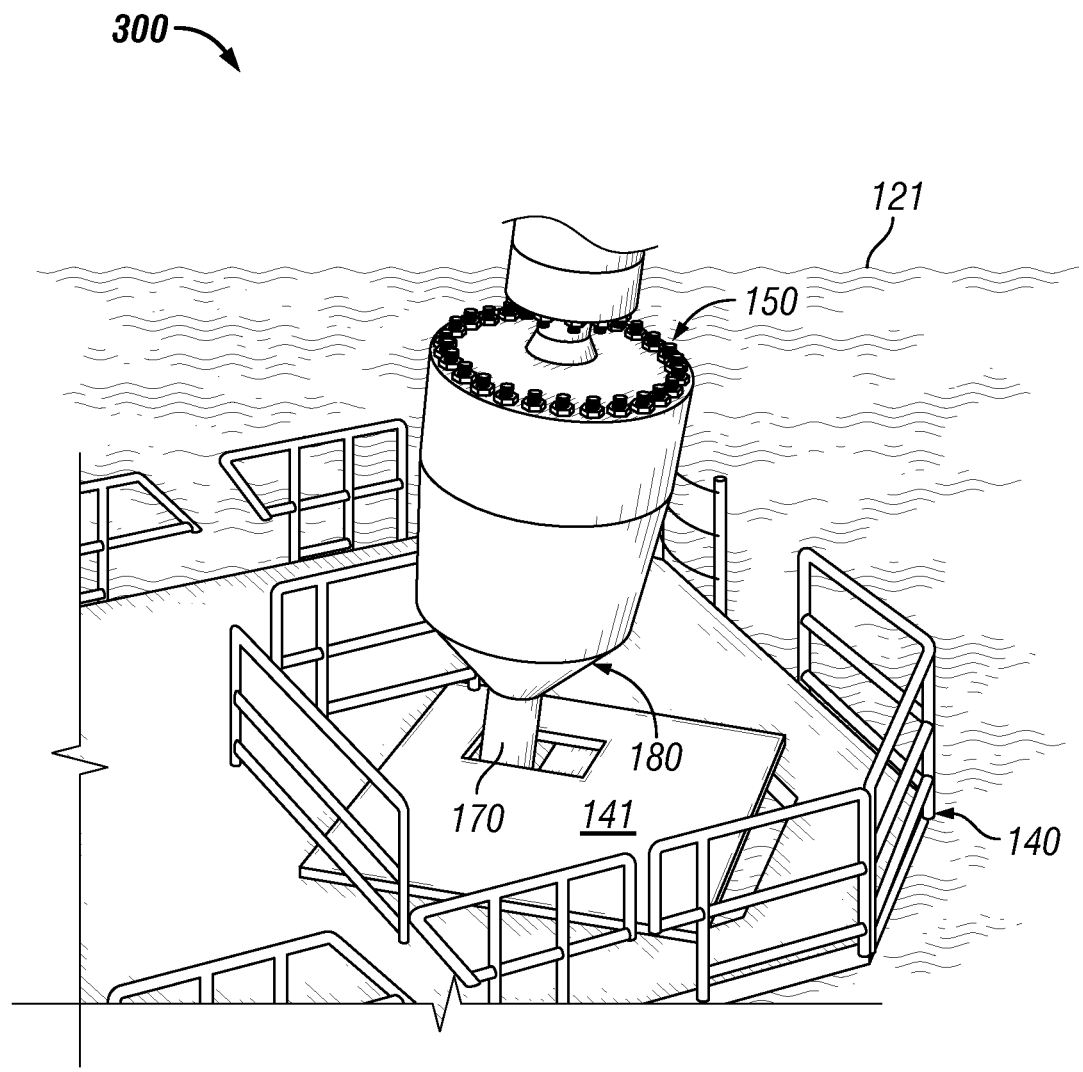

Before placing the flex joint 150 and the riser 170 in place for production field operations, the laydown tool 180 must be removed. As shown in FIGS. 3A and 3B, the riser and flex joint assembly 101 is lifted above the water level 121 into a temporary work platform 141 on the construction vessel 140 so that the laydown tool 180 can be accessed and removed. The flex joint 150 can weigh over a ton. Similarly, as stated above, the riser 170 can have a diameter of 10 inches or more. As explained above, in some cases, the riser 170 can have a diameter of less than 10 inches. Consequently, the safety of workers removing the laydown tool 180, positioned underneath the flex joint 150 and above the top of the riser 170, can be at risk.

In addition to the safety concern, the process of lifting the riser and flex joint assembly 101 all the way up into the temporary work platform 141 on the construction vessel 140 and removing the laydown tool 180 is time-consuming. The cost to rent the equipment and manpower required to place the various assemblies (e.g., the riser and flex joint assembly 101) on the seabed 110 and subsequently put those assemblies in place for production field operations is very high. In many cases, it can cost over $1 million each day. Therefore, expediting any of the processes involved can have a significant economic impact on a field operation.

Figure 4:
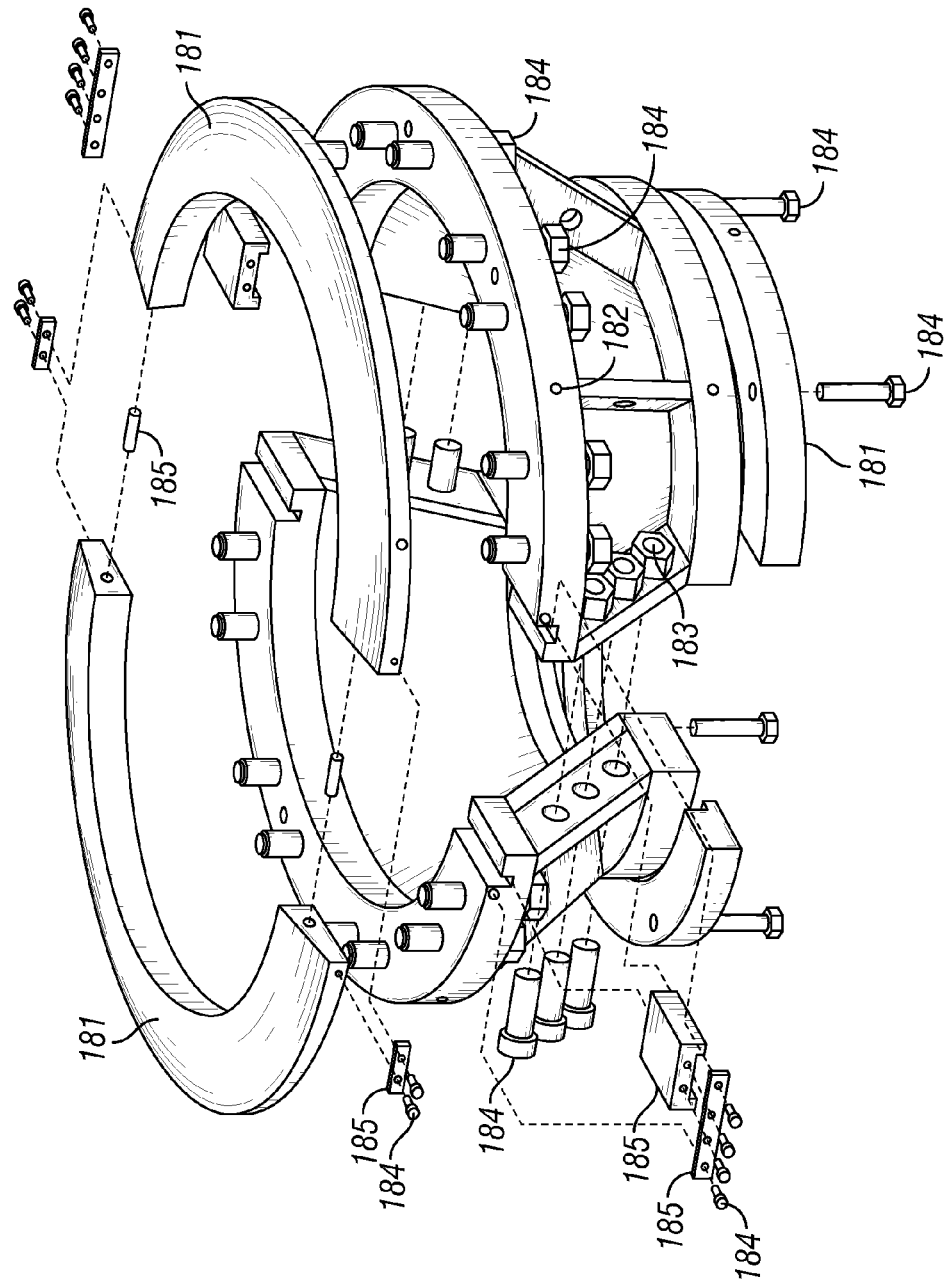
FIG. 4 shows a flex joint laydown tool in accordance with current practices in the art.

Unfortunately, the laydown tool 180 currently used in subsea field operations, as shown in FIG. 4, is complex, having multiple pieces. As a result, disassembly of the laydown tool 180 requires lifting the riser and flex joint assembly 101 to the surface, which requires significant amounts of time to perform. For example, as shown in FIG. 4, the laydown tool 180 currently used in subsea field operations has multiple rings 181, collars 182, nuts 183, bolts 184, and plates 185. Because of all of these parts and fastening devices, the riser and flex joint assembly 101 must be brought above the surface 121 in order to remove the laydown tool 180.

The existing laydown tool 180 is installed above the water level 121 prior to shipment of the flex joint 150 to the installation vessel. Removal by a ROV is impractical with the current design given the number/configuration of fasteners, the weight of the laydown tool 180, and the significant number of steps in the removal process. Using a diver to remove the existing laydown tool 180, while possible, would require mobilization of a diving spread not normally needed for other functions of the job scope, thus adding significant cost. In addition, the diver's safety and equipment on the seabed can be in jeopardy as a result of the falling of unattached objects during the disassembly process.

In addition, the weight of the riser and flex joint assembly 101 would require a second crane in close proximity to the diver, which dramatically increases safety risks for "caught by/against" hazards. Even further, in order to reach all the mounting bolts 184 of an existing laydown tool 180, a diver would be positioned in the line of fire if a crane failure where to drop the riser and flex joint assembly 101. Even when the riser and flex joint assembly 101 is recovered to the surface 121 for removal, as shown in FIGS. 3A and 3B, crew members are forced to work under a suspended crane load.

By contrast, example laydown tools 580, as shown in FIGS. 5A-5D, have a significantly simpler design, which allows the laydown tool 580 to be uncoupled from the riser and flex joint assembly 101 and removed under water 228. In other words, the riser and flex joint assembly 101 does not need to be lifted to the surface 121 to remove the laydown tool, as is currently required. Consequently, the safety of workers is not compromised during the removal of the laydown tool 580, time and money are saved in not having to move the construction vessel 140 as much, which translates to significant time (and thus cost) saved compared to the laydown tool 180 as is currently used in subsea field production operations.

Figure 5A:
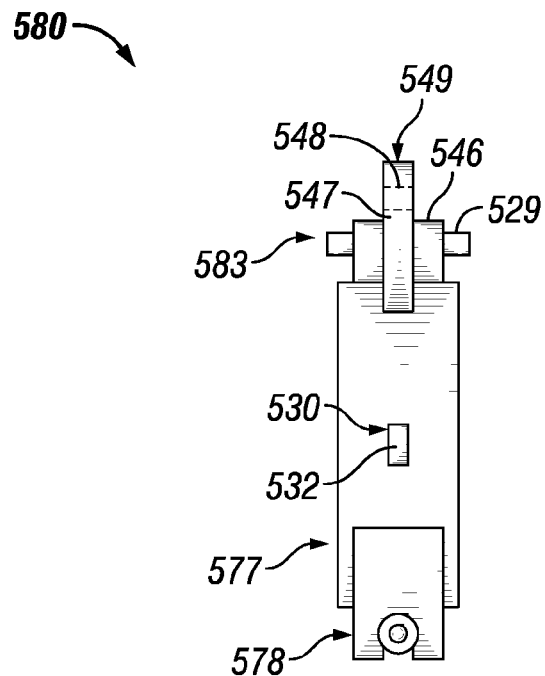
FIGS. 5A-5D show various views of a flex joint laydown tool in accordance with certain example embodiments.
Figure 5B:
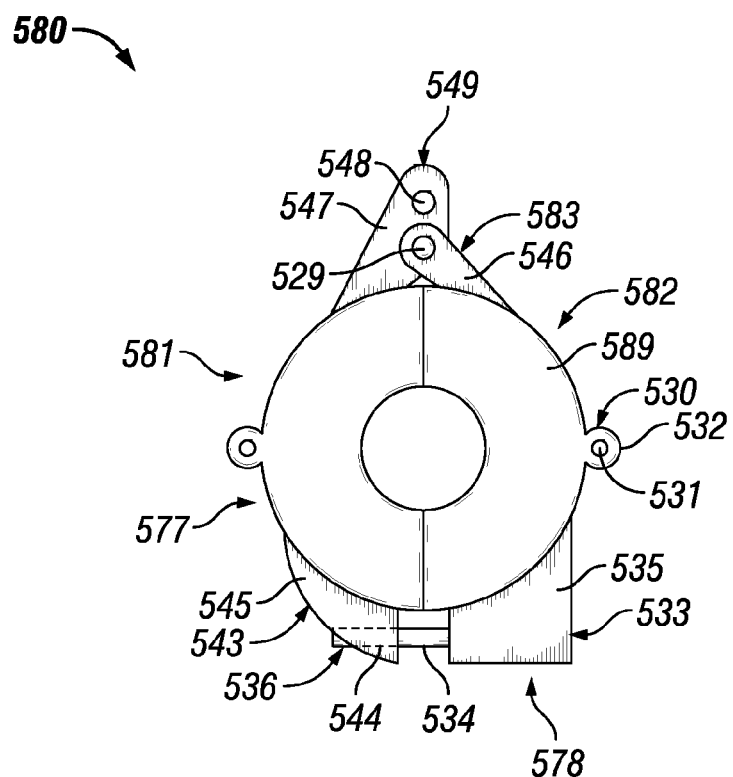
Figure 5C:
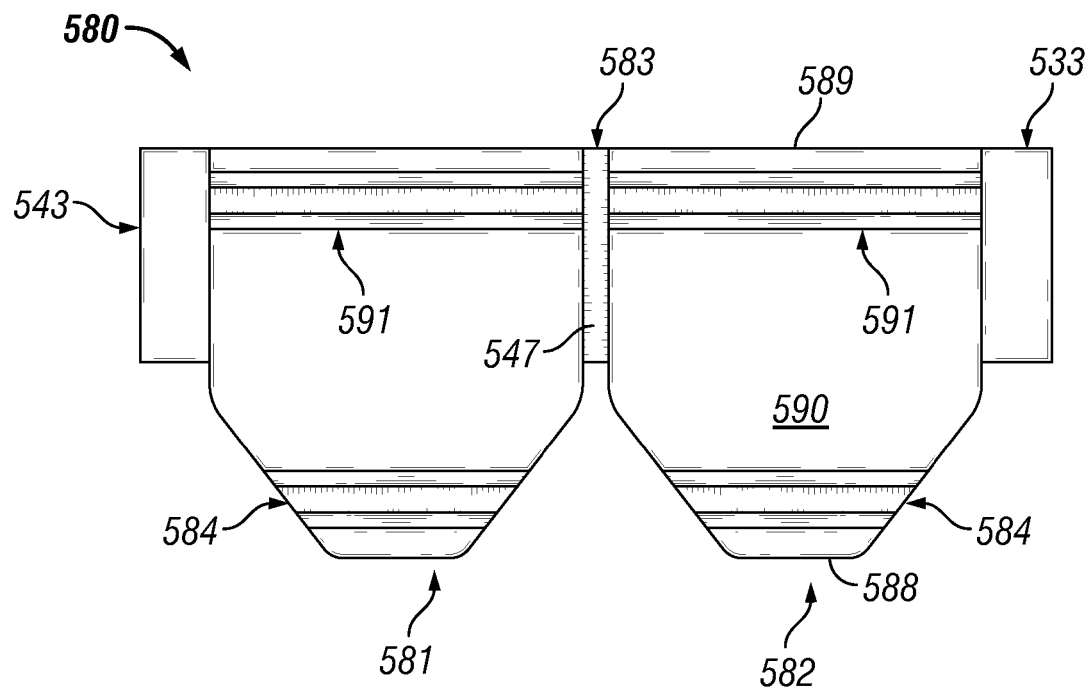
Figure 5D:
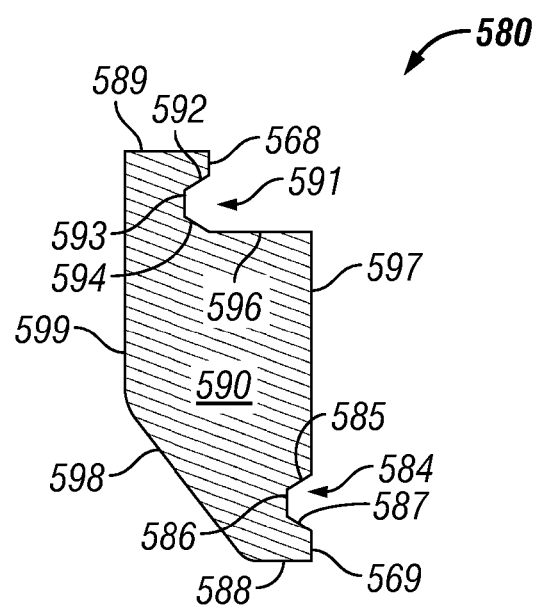

FIG. 5A shows a side view of a laydown tool 580 in a closed position in accordance with certain example embodiments. FIG. 5B shows a top view of the laydown tool 580 in the closed position in accordance with certain example embodiments. FIG. 5C shows a front view of the laydown tool 580 in an open position in accordance with certain example embodiments. FIG. 5D shows a cross sectional side view of on portion of the laydown tool 580 in accordance with certain example embodiments. In one or more embodiments, one or more of the features shown in FIGS. 5A-5D may be omitted, added, repeated, and/or substituted. Accordingly, embodiments of a laydown tool should not be considered limited to the specific arrangements of components shown in FIGS. 5A-5D.

Referring to FIGS. 1-5D, the laydown tool 580 of FIGS. 5A-5D can include a body 577 having multiple portions (in this case, portion 581 and portion 582) that are connected by at least one coupling section 583 (in this case, a hinge).

Alternatively, the coupling section 583 can be removed when portion 581 and portion 582 are separate pieces that are coupled to each other. Further, one or more portions can include one or a number of features. For example, aside from the coupling section 583, the laydown tool 580 can include a riser coupling feature 584, a flex joint coupling feature 591, at least one sling coupling feature 530, a shackle coupling feature 549, and at least one laydown tool coupling feature (in this case, base 533 and receiver 543).

In certain example embodiments, the various portions (e.g., portion 581, portion 582) of the body 577 of the laydown tool 580 can have a wall 590, a top surface 589, a bottom surface 588, an inner surface (e.g., inner surface 568, inner surface 597), an outer surface (e.g., outer surface 599, outer surface 598), and a coupling feature (e.g., base 533, receiver 543). The distance between the top surface 589 and the bottom surface 588 can represent a height of the laydown tool 580, and the distance between the inner surface 597 and an outer surface (e.g., outer surface 599) can represent a thickness of the laydown tool 580.

As shown in FIGS. 5A-5D, a portion of the laydown tool 580 can have various features that cause the portion to have more than one surface on a particular side of the portion. For example, each portion can have multiple outer surfaces (outer surface 599, outer surface 598) and multiple inner surfaces (inner surface 568, inner surface 597). In any case, the wall 590 of a portion (e.g., portion 581, portion 582) that is defined by the various surfaces can be a single piece in certain example embodiments.

When the coupling section 583 that joins portion 581 and portion 582 of the laydown tool 580 is a hinge, one part of the coupling section 583 can be a backing member 547 that extends from portion 581, and another part of the coupling section 583 can be a backing member 546 that extends from portion 582. In such a case, the backing member 546 and the backing member 547 can be joined by a pin 529 that traverses an aperture in each that align with each other when the backing member 546 and the backing member 547 are properly oriented with respect to each other.

The backing member 547 of the coupling section 583 can form a single piece (as from a mold) with the portion 581. Alternatively, the backing member 547 can be a separate piece from the portion 581, where the backing member 547 and the portion 581 are fixedly coupled, directly (e.g., welding) or indirectly (e.g., bolts), together. Similarly, the backing member 546 of the coupling section 583 can form a single piece with the portion 582. Alternatively, the backing member 546 can be a separate piece from the portion 582, where the backing member 546 and the portion 582 are fixedly coupled, directly or indirectly, together.

The purpose of the coupling section 583 is to allow multiple portions (in this case, portion 581 and portion 582) of the laydown tool 580 to move independently of each other while still remaining coupled to each other. In certain example embodiments, the coupling section 583 is not part of the laydown tool 580 and is instead replaced by a second laydown tool coupling feature, such as the laydown tool coupling feature 578 described below. In such a case, the multiple portions of the laydown tool 580 would be removably coupled to each other.

In certain example embodiments, the coupling section 583 can include one or more other features. For example, as shown in FIG. 5B, one of the backing members (in this case, backing member 547) can have a shackle coupling feature 549 for receiving a shackle (not shown) to lift the laydown tool 580. In this case, the shackle coupling feature 549 is an aperture 548 that traverses the backing member 547. In such a case, the thickness of the backing member 547, as well as the placement of the aperture 548 in the backing member 547, can be sufficient to support the entire weight of the laydown tool 580 when a shackle, coupled to the coupling section 583, lifts the laydown tool 580. Since the shackle can be used to remove the laydown tool 580 when the body 577 of the laydown tool is in the open position, the shackle can be called a removal device, and the shackle coupling feature 549 can be called a removal device coupling feature 549.

In certain example embodiments, the body 577 of the laydown tool 580 can include one or more features to aid in lifting and/or maneuvering some or all of the laydown tool 580 during a subsea field operation. For example, as shown in FIGS. 5A and 5B, one or more portions (in this case, portion 581 and portion 582) can include a sling coupling feature 530. Here, the sling coupling feature 530 is an eyelet disposed on the outer surface 599 of the body 577, where the eyelet has a body 532 that forms an aperture 531 through which a sling (not shown) can be disposed. In such a case, the sling (or multiple slings) can be used to manipulate (as by, for example, a lifting device, a diver, or a remotely operated vehicle (ROV) operating under water 228) the portion of the laydown tool 580 to which the sling coupling feature 530 is disposed.

Each sling coupling feature 530 can form a single piece (as from a mold) with the portion to which the sling coupling feature 530 is attached. Alternatively, the sling coupling feature 530 can be a separate piece from the portion, where the sling coupling feature 530 and the portion are fixedly coupled, directly (e.g., welding) or indirectly (e.g., bolts), together. A portion of the body 577 of the laydown tool 580 can have no sling coupling features, one sling coupling feature 530, or multiple sling coupling features 530. Since the sling can be used to remove the laydown tool 580 when the body 577 of the laydown tool is in the open position, the sling can be called a removal device, and the sling coupling feature 530 can be called a removal device coupling feature 530.

Figure 6A:
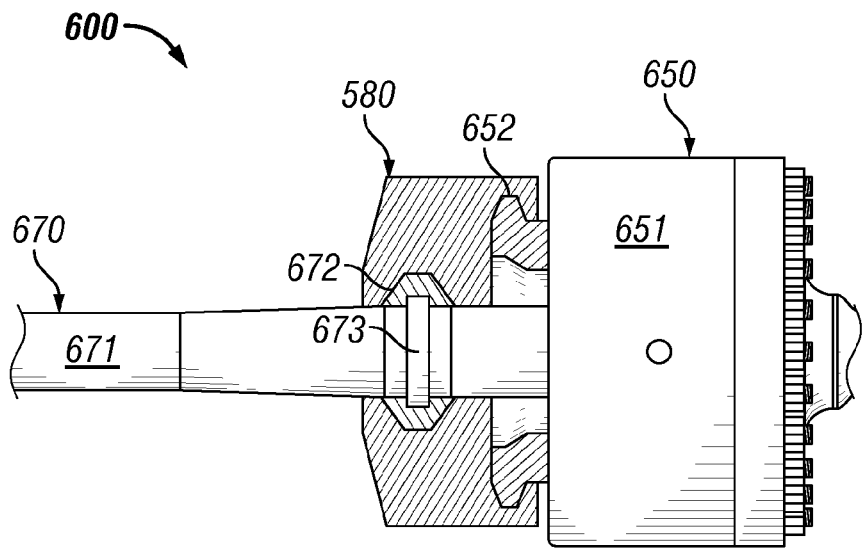
FIGS. 6A and 6B show a riser and flex joint assembly in accordance with certain example embodiments.
Figure 6B:
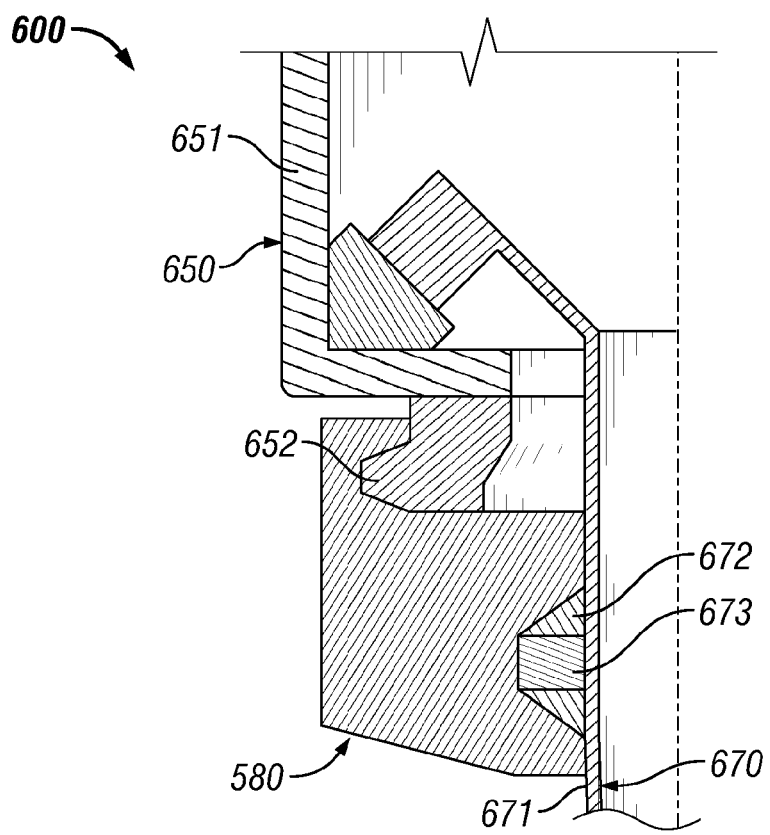

Since the portions of the body 577 of the laydown tool 580 are moveably coupled with respect to each other, the portions of the body 577 can have a number of orientations with respect to each other. When the portions of the body 577 enclose the riser 170 and the flex joint 150, as shown in FIGS. 6A and 6B below, the body 577 of the laydown tool 580 is said to be in a closed position. When the portions of the body 577 are in substantially any other position, the body 577 is said to be in an open position.

When the body 577 is in the closed position, one or more laydown tool coupling features 578 can be used to secure the portions of the body 577 in the closed position. Each laydown tool coupling feature 578 can have any of a number of configurations. For example, as shown in FIGS. 5A-5C, the laydown tool coupling feature 578 can include a receiver 543 disposed on the portion 581 of the body 577, and a base 533 disposed on the portion 582 of the body 577. The base 533 can have a body 535 and include a coupling feature 534 (e.g., a bolt) that extends from the base 533 and into a complementary coupling feature 544 (e.g., a threaded aperture) disposed in the body 545 of the receiver 543. In certain example embodiments, the laydown tool coupling feature 578 includes a torque tool bucket.

The coupling feature 534 of the base 533 and/or the complementary coupling feature 544 of the receiver 543 can be operated (e.g., coupled, decoupled) using one or more of a number of methods. For example, the coupling feature 534 and/or the complementary coupling feature 544 can be operated hydraulically. As another example, the coupling feature 534 and/or the complementary coupling feature 544 can be operated mechanically. In some cases, as when the coupling feature 534 becomes stuck within the complementary coupling feature 544, a gap can be formed between the body 545 of the receiver 543 and the body 535 of the base 533. In such a case, the coupling feature 534 can be exposed and cut, allowing a user to move one or more portions of the body 577 of the laydown tool 580 into the open position.

Each component (e.g., base 533, receiver 543) of the laydown tool coupling features 578 can form a single piece (as from a mold) with the portion (e.g., portion 581, portion 582) of the body 577 of the laydown tool 580 to which the component of the laydown tool coupling feature 578 is attached. Alternatively, the various components of the laydown tool coupling features 578 can be a separate piece from the portion, where the laydown tool coupling features 578 and the portion are fixedly coupled, directly (e.g., welding) or indirectly (e.g., bolts), together.

In certain example embodiments, one or more securing features 536 is disposed on the body 545 of the receiver 543 and/or the body 535 of the base 533 to secure the coupling of the coupling feature 534 and the complementary coupling feature 544. The securing feature 536 can take one or more of a number of forms (e.g., nut, latch) and can be operated in one or more of a number of ways (e.g., hydraulically, mechanically). When the securing feature 536 is engaged, the coupling feature 534 and the complementary coupling feature 544 remain coupled to each other. When the securing feature 536 is disengaged, the coupling feature 534 and the complementary coupling feature 544 can be decoupled from each other.

As discussed above, one or more portions of the body 577 of the laydown tool 580 can include a flex joint coupling feature 591. In certain example embodiments, the flex joint coupling feature 591 can be disposed on an inner surface (e.g., inner surface 568) of one or more portions (in this case, portion 581 and portion 582) of the body 577 of the laydown tool 580. In such a case, the flex joint coupling feature 591 can be positioned toward the top surface 589 (also sometimes called the proximal end of the body 577 of the laydown tool 580).

In certain example embodiments, the flex joint coupling feature 591 complements a laydown tool coupling feature 652 disposed on the flex joint 650, as discussed below with respect to FIGS. 6A and 6B. In other words, when the body 577 of the laydown tool 580 is in the closed position, the flex joint coupling feature 591 couples with the laydown tool coupling feature 652 disposed on the flex joint 650. In some cases, rather than using a modified flex joint 650 as shown in FIGS. 6A and 6B, a flex joint currently used in the art (e.g., flex joint 150) can be used, so that the flex joint coupling feature 591 is configured to couple to an existing feature of the flex joint 150. In any case, the flex joint coupling feature 591 can be continuous, set in discrete segments, uniform along its length, and/or have any other features that enable the flex joint coupling feature 591 to couple with the laydown tool coupling feature 652 disposed on the flex joint 650 when the body 577 of the laydown tool 580 is in the closed position.

The flex joint coupling feature 591 can have any of a number of features, shapes, and/or sizes. For example, as shown in FIGS. 5C and 5D, the flex joint coupling feature 591 can have a substantially v-shaped profile when viewed from the side. In this case, the flex joint coupling feature 591 has a back segment 593 that is substantially parallel with the inner surface 568 and the inner surface 597. Adjacent to the back segment 593 is a side segment 592 on one side and a side segment 594 on the other side. Side segment 592 is also adjacent to inner surface 568, and side segment 594 is also adjacent to surface 596. Since, in this case, the flex joint coupling feature 591 is recessed relative to the inner surface 597, surface 596 provides a transition between the flex joint coupling feature 591 and the inner surface 597.

Similarly, as discussed above, one or more portions of the body 577 of the laydown tool 580 can include a riser coupling feature 584. In certain example embodiments, the riser coupling feature 584 can be disposed on an inner surface (e.g., inner surface 597) of one or more portions (in this case, portion 581 and portion 582) of the body 577 of the laydown tool 580. In such a case, the riser coupling feature 584 can be positioned toward the bottom surface 588 (also sometimes called the distal end of the body 577 of the laydown tool 580).

In certain example embodiments, the riser coupling feature 584 complements a laydown tool coupling feature 672 disposed on the riser 670, as discussed below with respect to FIGS. 6A and 6B. In other words, when the body 577 of the laydown tool 580 is in the closed position, the riser coupling feature 584 couples with the laydown tool coupling feature 672 disposed on the riser 670. In some cases, rather than using a modified riser 670 as shown in FIGS. 6A and 6B, a riser currently used in the art (e.g., riser 170) can be used, so that the riser coupling feature 584 is configured to couple to an existing feature of the riser 170. In any case, the riser coupling feature 584 can be continuous, set in discrete segments, uniform along its length, and/or have any other features that enable the riser coupling feature 584 to couple with the laydown tool coupling feature 672 disposed on the riser 670 when the body 577 of the laydown tool 580 is in the closed position.

The riser coupling feature 584 can have any of a number of features, shapes, and/or sizes. For example, as shown in FIGS. 5C and 5D, the riser coupling feature 584 can have a substantially v-shaped profile when viewed from the side. In this case, the riser coupling feature 584 has a back segment 586 that is substantially parallel with the inner surface 568 and the inner surface 597. Adjacent to the back segment 586 is a side segment 585 on one side and a side segment 587 on the other side. Side segment 592 is also adjacent to inner surface 597, and side segment 594 is also adjacent to inner surface 569.

FIGS. 6A and 6B show a riser and flex joint assembly 600 that includes the laydown tool 580 of FIGS. 5A-5D in accordance with certain example embodiments. In one or more embodiments, one or more of the features shown in FIGS. 6A and 6B may be omitted, added, repeated, and/or substituted. Accordingly, embodiments of a riser and flex joint assembly should not be considered limited to the specific arrangements of components shown in FIGS. 6A and 6B.

Referring to FIGS. 1-6B, the riser 670 can be substantially the same as the riser 170 of FIGS. 2A-3B. In such a case, a feature (e.g., riser coupling 673) that currently exists on a riser 170 known and used in the current art can serve as the laydown joint coupling feature, described above with respect to FIGS. 5A-5D, that couples to the riser coupling feature 584 of the laydown tool 580 when the body 577 of the laydown tool 580 is in the closed position. In other words, in such a case, the riser coupling feature 584 of an example laydown tool 580 can couple to existing feature of a riser 170 currently used in subsea field operations, where that feature serves as the laydown tool coupling feature of the riser 170.

Alternatively, the riser 670 of FIGS. 6A and 6B can be modified relative to the riser 170 of FIGS. 2A-3B. For example, feature 672 can be added to an outer surface of the riser adjacent to the riser coupling 673. Specifically, as shown in FIGS. 6A and 6B, the laydown tool coupling feature 672 of the riser 670 can be disposed on an outer surface of the riser 650, where the laydown tool coupling feature 672 extends radially outward from the outer surface of the riser 650. In such a case, that feature 672 can serve as the laydown joint coupling feature 672 that couples to the riser coupling feature 584 of the laydown tool 580 when the body 577 of the laydown tool 580 is in the closed position. In other words, in such a case, the riser coupling feature 584 of an example laydown tool 580 can couple to new feature of a riser 670 that has been modified for use with the example laydown tool 580, where that feature serves as the laydown tool coupling feature 672 of the riser 670.

Similarly, the flex joint 650 can be substantially the same as the flex joint 150 of FIGS. 2A-3B. In such a case, a feature that currently exists on a flex joint 150 known and used in the current art can serve as the laydown joint coupling feature, described above with respect to FIGS. 5A-5D, that couples to the flex joint coupling feature 591 of the laydown tool 580 when the body 577 of the laydown tool 580 is in the closed position. In other words, in such a case, the flex joint coupling feature 591 of an example laydown tool 580 can couple to existing feature of a flex joint 150 currently used in subsea field operations, where that feature serves as the laydown tool coupling feature of the flex joint 150.

Alternatively, the flex joint 650 of FIGS. 6A and 6B can be modified relative to the flex joint 150 of FIGS. 2A-3B. For example, feature 652 can be added to flex joint 650. As shown in FIGS. 6A and 6B, feature 652 can be disposed on a bottom surface of the body 651 of the flex joint 650. Specifically, the laydown tool coupling feature 652 of the flex joint 650 is disposed on, or can be, an extension of the flex joint 650, where the extension extends from the bottom of the body 651 of the flex joint 650 in a substantially axial direction with respect to a length of the flex joint 650. In such a case, that feature 652 can serve as the laydown joint coupling feature 652 that couples to the flex joint coupling feature 591 of the laydown tool 580 when the body 577 of the laydown tool 580 is in the closed position. In other words, in such a case, the lay down coupling feature 591 of an example laydown tool 580 can couple to new feature 652 of a flex joint 650 that has been modified for use with the example laydown tool 580, where that feature 652 serves as the laydown tool coupling feature 652 of the flex joint 650.

Figures 7A, 7B:
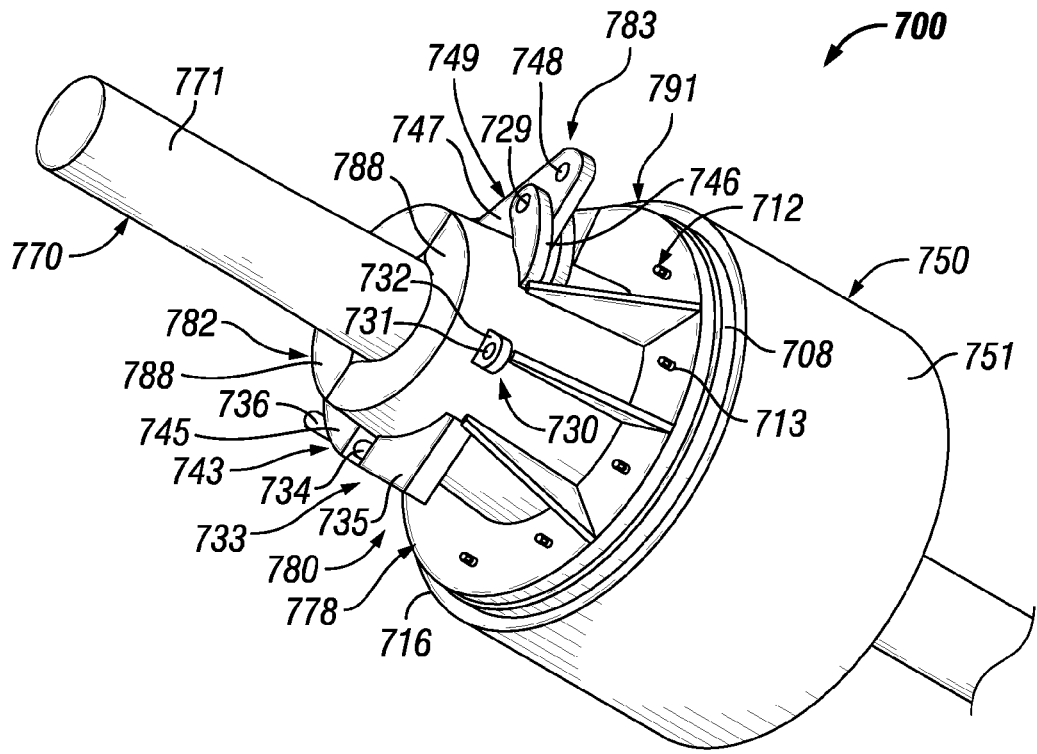
FIGS. 7A-7C show another riser and flex joint assembly in accordance with certain example embodiments.
Figure 7C:
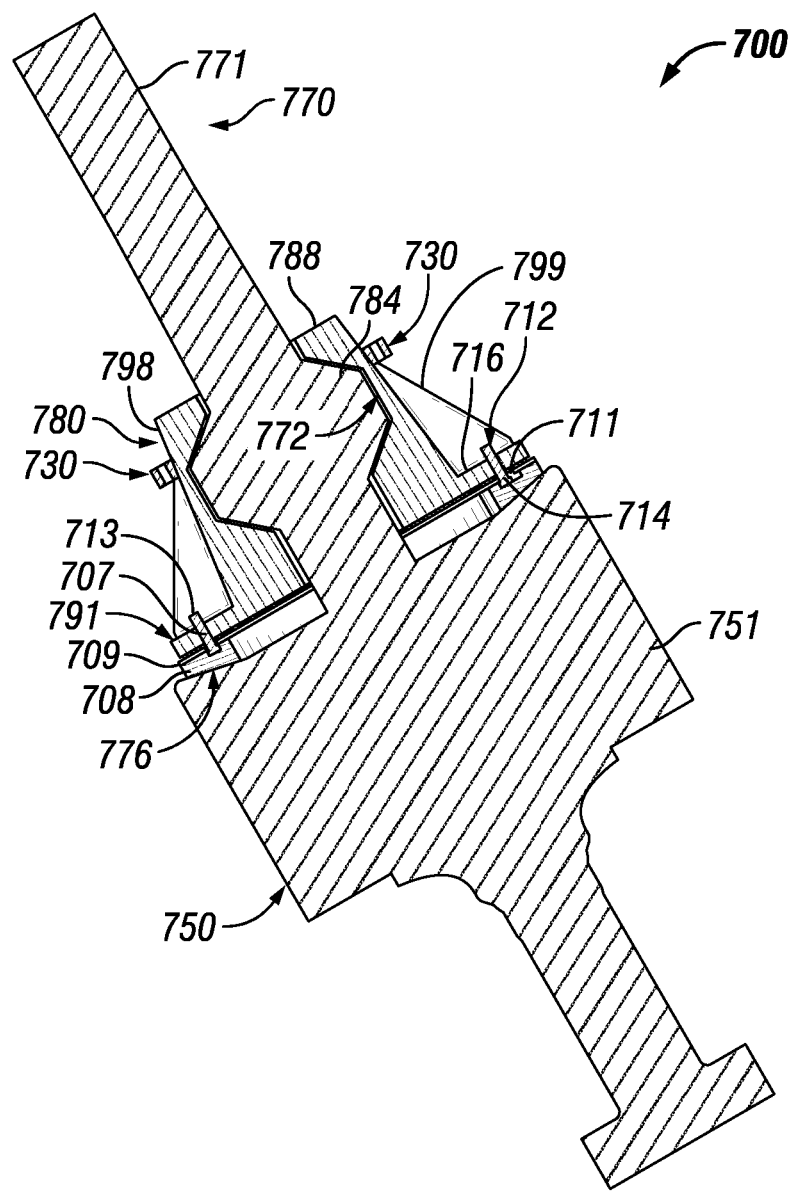

FIGS. 7A-7C show another riser and flex joint assembly 700 in accordance with certain example embodiments. FIG. 7A shows a side perspective view of the riser and flex joint assembly 700. FIG. 7B shows a top view of the riser and flex joint assembly 700. FIG. 7C shows a cross-sectional side view of the riser and flex joint assembly 700. In one or more embodiments, one or more of the features shown in FIGS. 7A-7C may be omitted, added, repeated, and/or substituted. Accordingly, embodiments of a riser and flex joint assembly should not be considered limited to the specific arrangements of components shown in FIGS. 7A-7C.

Referring to FIGS. 1-7C, the laydown tool 780 of FIGS. 7A-7C is substantially the same as the laydown tool 580 of FIGS. 5A-5D, except as described below. For example, the flex joint coupling feature 784 of FIGS. 7A-7C can be substantially the same as the flex joint coupling feature 584 of FIGS. 5A-5D, where in this case the flex joint coupling feature 784 couples to the laydown tool coupling feature 772 disposed on the body 771 of the flex joint 770. As another example, the distal end of the laydown tool 780 of FIGS. 7A-7C is defined by the bottom surface 788, just as the distal end of the laydown tool 580 of FIGS. 5A-5D is defined by the bottom surface 588. For the sake of simplicity, the description of the components and/or features shown in FIGS. 7A-7C can be inferred from the description of the corresponding components and/or features shown and described above with respect to FIGS. 5A-5D such that each component and/or feature is represented by a three digit number having the identical last two digits. As an example, the description of the sling coupling features 530 (including its various components) with respect to FIGS. 5A-5D above can be applied to the sling coupling features 730 (including its various components) shown in FIGS. 7A-7C. As another example, the description of the laydown tool coupling feature 578 and coupling section 583 (including their various components) with respect to FIGS. 5A-5D above can be applied to the laydown tool coupling feature 778 and coupling section 783 (including their various components) shown in FIGS. 7A-7C. The flex joint coupling feature 791 of the laydown tool 780 in FIGS. 7A-7C includes a number of features. For example, the flex joint coupling feature 591 can include a tension plate 708 having a number of apertures 711 (e.g., slots) that receive a number of fastening devices 712 (e.g., tension bolts). The apertures 711 in the tension plate 708 allow the fastening devices 712 to slide or otherwise move slightly relative to the distal end 776 (also called a laydown tool coupling feature 776) of the body 751 of the flex joint 750. This feature can be important because the opening motion of the laydown tool 780 would otherwise have the effect of increasing tension as the tension plate 708 and the distal end 776 of the body 751 of the flex joint 750 ride against each other. Thus, the tension plate 708 must remain as stationary as possible until the profile of the riser 770 releases sufficiently to prevent this, and the apertures 711 in the tension plate allow for this.

The fastening devices 712 can include a head 714 and a stem 713. The head 714 of the fastening device 712 can be disposed within the apertures 711 in the tension plate 708. The fastening devices 712 (in this case, the stem 713 of each fastening device 712) can also be disposed in apertures 707 that traverse the bottom portion 716 of the laydown tool 780. In certain example embodiments, the flex joint coupling feature 791 can also include one or more keeper plates 709, which can lock the tension plate 708 and the fastening devices 712 to the bottom portion 716 of the laydown tool 780 to prevent objects (e.g., a fastening device 712) from being dropped when the laydown tool 780 is uncoupled from the riser 770 and the flex joint 750.

The laydown tool 780 can also include a number of fins 799 that span the main portion 798 and the bottom portion 716 of the laydown tool 780. These fins 799 can provide flexibility and structural support as the riser and flex joint assembly 700 is moved. The number, thickness, height, and/or other features of each fin 799 can vary. Further, the features of one fin 799 can be substantially the same as, or different than, the features of the other fins 799. In this case, the laydown tool 780 does not have a shackle or removal device coupling feature, such as the shackle device coupling feature 549 of the laydown tool 580 of FIGS. 5A-5D. Alternatively, the laydown tool 780 can include a shackle device coupling feature, which can be substantially the same as, or different than, the shackle device coupling feature 549 of FIGS. 5A-5D.

The coupling section 783 that joins portion 781 and portion 782 of the laydown tool 780 can be a hinge (hidden from view). Alternatively, rather than portion 781 and portion 782 being hingedly coupled to each other, the coupling section 783 can facilitate direct or indirect coupling of portion 781 and portion 782 of the laydown tool as separate pieces. In such a case, the coupling section 783 can be configured substantially the same as, or differently than, the coupling section 583 of FIGS. 5A-5D. Also, the laydown tool coupling feature 778 can be substantially the same as, or have a different configuration compared to, the laydown tool coupling feature 578 of FIGS. 5A-5D. For example, the laydown tool coupling feature 778 can include one or more latches. In any case, the laydown tool coupling feature 778 can be configured so that no portions or components of the laydown tool coupling feature 778 are loose and can be lost when uncoupling the portion 781 and the portion 782 of the laydown tool 780.

Figure 8:
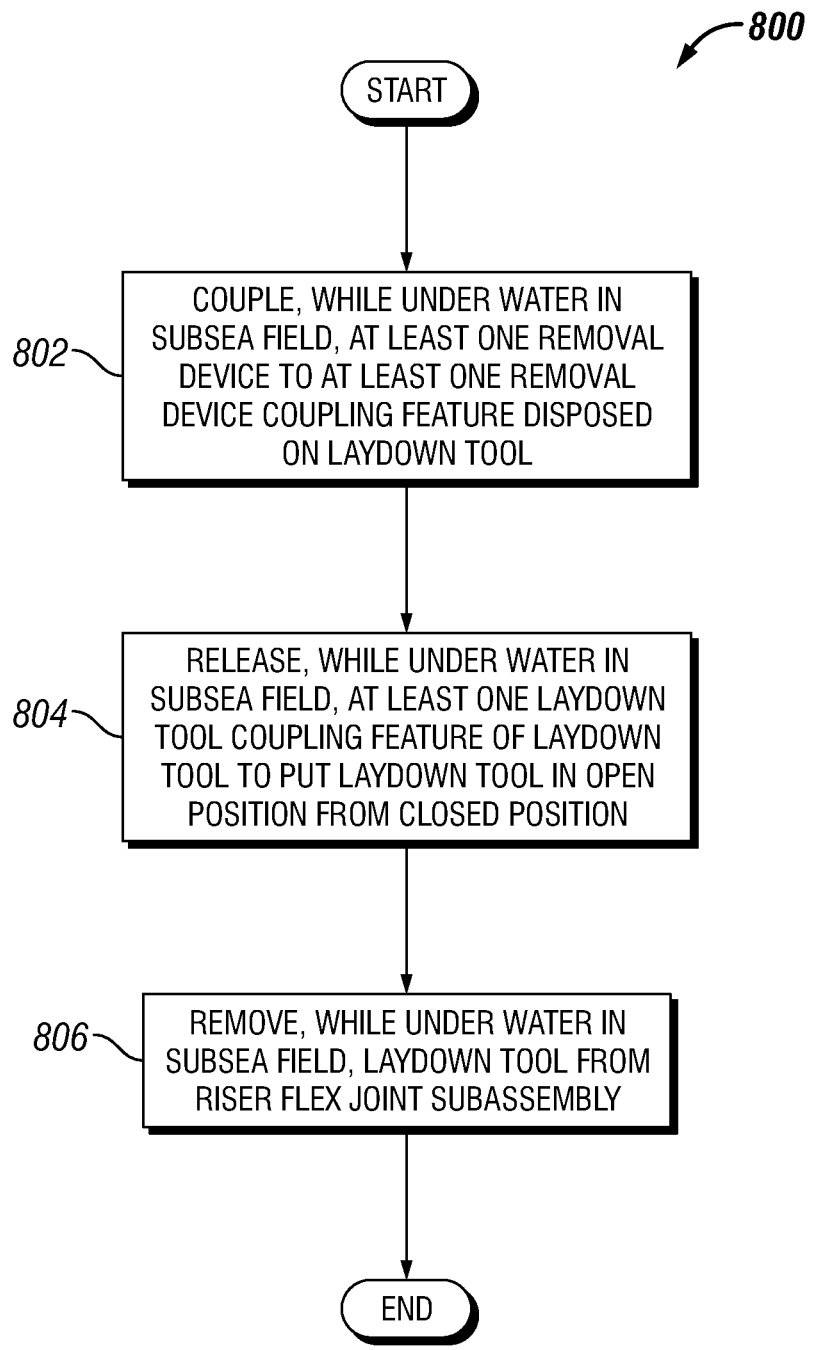
FIG. 8 shows a flowchart of a method for removing a subsea removable laydown tool from a riser flex joint subassembly in a subsea field in accordance with certain example embodiments.

FIG. 8 shows a flowchart of a method 800 for removing a subsea removable laydown tool from a riser flex joint subassembly in a subsea field. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order. In addition, a person of ordinary skill in the art will appreciate that additional steps not shown in FIG. 8, may be included in performing this method. Accordingly, the specific arrangement of steps should not be construed as limiting the scope.

Referring now to FIGS. 1-8, the example method 800 begins at the START step and proceeds to step 802, where at least one removal device (e.g., a shackle, a sling) is coupled to at least one removal device coupling feature (e.g., shackle coupling feature 549, sling coupling feature 530, rigging) disposed on the laydown tool 580. In certain example embodiments, the removal device is coupled to the removal device coupling feature while under water 228 in the subsea field. The removal device can be coupled to the removal device coupling feature in one or more of a number of ways, including but not limited to using a ROV and using one or more divers.

In step 804, at least one laydown tool coupling feature 578 of the laydown tool 580 is released. In certain example embodiments, the laydown tool coupling feature 578 is released while under water 228 in the subsea field. When the laydown tool coupling feature 578 is released, the body 577 of the laydown tool 580 can be put in an open position from a closed position. The laydown tool 580 can be coupled to the riser flex joint subassembly (in this case, the flex joint 650 and the riser 670) when the laydown tool 580 is in the closed position, creating the riser and flex joint assembly 600.

The laydown tool coupling feature 578 of the laydown tool 580 can be released in one or more of a number of ways, including but not limited to hydraulically (controlled above the water level 121), mechanically, using a ROV under water 228, using a disconnection device, a coupling device actuator, using a torque tool, using a mechanical operator, and using one or more divers. In certain example embodiments, if a removal device (e.g., a disconnection tool) is used to release the laydown tool coupling feature 578, the removal device can be put in place relative to a portion (e.g., base 533) of the laydown tool coupling feature 578 at some point (e.g., after completing step 802) prior to performing step 804.

The laydown tool coupling feature 578 of the laydown tool 580 can be released by operating the laydown tool coupling feature 578 in substantially the opposite way in which the laydown tool coupling feature 578 was operated to place the body 577 of the laydown tool 580 in the closed position. Alternatively, the laydown tool coupling feature 578 of the laydown tool 580 can be released by some other means, such as cutting a portion (e.g., coupling feature 534) of the laydown tool coupling feature 578. When the laydown tool coupling feature 578 is released, the laydown tool 580 can be put into the open position. In such a case, the at least one removal device coupling feature of step 802 can be used to move the laydown tool 580 toward the open position.

In step 806, the laydown tool 580 is removed from the riser flex joint subassembly. The laydown tool 580 can be removed while under water 228 in the subsea field. The laydown tool 580 can be removed using one or more lifting devices in combination with the at least one removal device coupling feature of step 802. Removing the laydown tool 580 can include lifting the laydown tool 580 away from the riser flex joint subassembly (the riser 670 and the flex tool 650) to the surface 121 while the riser flex joint subassembly remains under water 228. When the laydown tool 580 is removed, other components and/or devices can also be removed. For example, if a removal device is used to release the laydown tool coupling feature 578, the removal device can also be removed with the laydown tool 580. As another example, the at least one removal device coupling feature can also be removed with the laydown tool 580.

The systems, methods, and apparatuses described herein allow for safe and more efficient removal of a laydown tool from a riser and flex joint assembly. As a result, example embodiments significantly reduce the risk of injury and the amount of time required to remove the laydown tool. This, in turn, saves significant costs. Further, example laydown tools work equally as effectively as currently used laydown tools with respect to preserving the mechanical integrity of the riser and the flex joint so that these components can be installed as part of a subsea production field operation.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A flex joint laydown tool, comprising:
    a body comprising:
        a first portion; and
        a second portion hingedly coupled to the first portion;
    at least one flex joint coupling feature disposed on the first portion and the second portion at a proximal end of the body, wherein the at least one flex joint coupling feature is configured to couple to at least one first laydown tool coupling feature of a flex joint, wherein the at least one flex joint coupling feature applies pre-tensioning to the flex joint to protect the flex joint from bending while the first portion and the second portion are coupled to the flex joint;

a riser coupling feature disposed on an inner surface of the first portion and the second portion toward a distal end of the body, wherein the riser coupling feature is configured to couple with a second laydown tool coupling feature of a riser; and at least one third laydown tool coupling feature movably coupled to the first portion of the body, wherein the at least one third laydown tool coupling feature couples to the second portion when the body is in a closed position, wherein the at least one third laydown tool coupling feature decouples from the second portion of the body to allow the body to move from the closed position to an open position.

2. The flex joint laydown tool of claim 1, further comprising:

at least one securing feature disposed on the at least one third laydown tool coupling feature, wherein the at least one securing feature secures the body in the closed position by keeping the at least one third laydown tool coupling feature coupled to the second portion of the body when the at least one securing feature is engaged.

3. The flex joint laydown tool of claim 1, wherein the riser coupling feature has a substantially v-shaped profile.

4. The flex joint laydown tool of claim 1, wherein the at least one flex joint coupling feature comprises a tension plate and a fastening device disposed in an aperture that traverses the tension plate.

5. The flex joint laydown tool of claim 1, wherein the at least one third laydown tool coupling feature remains coupled to the first portion of the body when the body is in the open position.

6. The flex joint laydown tool of claim 1, wherein the at least one third laydown tool coupling feature operates mechanically.

7. The flex joint laydown tool of claim 1, wherein the first portion of the body comprises a first sling coupling feature that is configured to receive a first sling, and wherein when the second portion of the body comprises a second sling coupling feature that is configured to receive a second sling.

8. The flex joint laydown tool of claim 1, wherein the first portion of the body comprises a backing member, wherein the second portion is hingedly coupled to the backing member.

9. The flex joint laydown tool of claim 8, wherein the backing member comprises a shackle coupling feature that is configured to receive a shackle.

10. A riser and flex joint assembly, comprising:

a flex joint comprising at least one first laydown tool coupling feature;

a riser comprising a second laydown tool coupling feature; and a subsea removable laydown tool coupled to the riser and the flex joint, wherein the laydown tool comprises:

a laydown tool body comprising:
  a first portion; and
  a second portion hingedly coupled to the first portion;

at least one flex joint coupling feature disposed on the first portion and the second portion at a proximal end of the laydown tool body, wherein the at least one flex joint coupling feature couples with the at least one first laydown tool coupling feature of the flex joint, wherein the at least one flex joint coupling feature applies pre-tensioning to the flex joint to protect the flex joint from bending while the first portion and the second portion are coupled to the flex joint;

a riser coupling feature disposed on an inner surface of the first portion and the second portion toward a distal end of the laydown tool body, wherein the riser coupling feature couples with the second laydown tool coupling feature of the riser; and at least one third laydown tool coupling feature movably coupled to the first portion of the body, wherein the at least one third laydown tool coupling feature couples to the second portion of the body when the laydown tool body is in a closed position, wherein the at least one third laydown tool coupling feature decouples from the second portion to allow the laydown tool body to move from the closed position to an open position, wherein the laydown tool is coupled to the flex joint and the riser while under water during a subsea field operation.

11. The riser and flex joint assembly of claim 10, wherein the laydown tool further comprises at least one sling coupling feature.

12. The riser and flex joint assembly of claim 11, further comprising:

at least one sling coupled to the at least one sling coupling feature, wherein the at least one sling is attached to a lifting device, wherein the lifting device uses the at least one sling to remove the laydown tool from the flex joint and the riser while the laydown tool is in the open position and under water during the subsea field operation.

13. The riser and flex joint assembly of claim 10, wherein the first portion of the laydown tool body forms a substantially single piece.

14. The riser and flex joint assembly of claim 10, wherein the at least one flex joint coupling feature comprises a plurality of apertures that traverse the proximal end of the laydown tool body and a plurality of fastening devices that are disposed within the plurality of apertures.

15. The riser and flex joint assembly of claim 14, wherein the at least one flex joint coupling feature further comprises at least one tension plate disposed between the proximal end of the laydown tool and the flex joint, wherein the plurality of fastening devices provide a tension to the at least one tension plate prior to putting the flex joint, the riser, and the subsea removable laydown tool in water, and wherein the tension in the at least one tension plate is released as the laydown tool body is moved from the closed position to the open position.

16. The riser and flex joint assembly of claim 10, wherein the second laydown tool coupling feature of the riser is disposed on an outer surface of the riser, wherein the second laydown tool coupling feature extends radially outward from the outer surface of the riser, and wherein the second laydown tool coupling feature has a shape and size that substantially complements the shape and size of the riser coupling feature.

17. A method for removing a subsea removable laydown tool from a riser flex joint subassembly in a subsea field, the method comprising:

coupling, while under water in the subsea field, at least one removal device to at least one removal device coupling feature disposed on the laydown tool, wherein the laydown tool is coupled to the riser flex joint subassembly, wherein the laydown tool limits a freedom of movement of the riser flex joint subassembly while the laydown tool is coupled to the riser flex joint subassembly;

releasing, while under water in the subsea field, at least one laydown tool coupling feature of the laydown tool to put the laydown tool in an open position from a closed position, wherein the laydown tool is coupled to the riser flex joint subassembly when the laydown tool is in the closed position, wherein the riser flex joint subassembly comprises a flex joint and a riser, wherein releasing the at least one laydown tool coupling feature restores the freedom of movement between the flex joint and the riser; and removing, while under water in the subsea field and using the at least one removal device, the laydown tool from the riser flex joint subassembly, wherein the flex joint and the riser remain coupled to each other after the laydown tool is removed.

18. The method of claim 17, wherein the at least one removal device comprises a shackle.

19. The method of claim 18, wherein the at least one removal device further comprises at least one sling.

20. The method of claim 19, wherein removing the laydown tool comprises lifting, using the at least one sling and the shackle, while under water, the laydown tool away from the riser flex joint subassembly.

* * * * *